United States Patent
Youn

(10) Patent No.: US 8,744,076 B2
(45) Date of Patent: Jun. 3, 2014

(54) METHOD AND APPARATUS FOR ENCRYPTING DATA TO FACILITATE RESOURCE SAVINGS AND TAMPER DETECTION

(75) Inventor: Paul Youn, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1247 days.

(21) Appl. No.: 11/732,847

(22) Filed: Apr. 4, 2007

(65) Prior Publication Data

US 2009/0323932 A1    Dec. 31, 2009

(51) Int. Cl.
   *H04K 1/06*    (2006.01)
(52) U.S. Cl.
   USPC ............. 380/37; 380/28; 380/30; 713/168; 713/183
(58) Field of Classification Search
   USPC ................. 380/37, 30, 28; 713/168, 183
   See application file for complete search history.

(56) References Cited

U.S. PATENT DOCUMENTS

| | | | | |
|---|---|---|---|---|
| 5,748,740 A * | 5/1998 | Curry et al. | | 705/65 |
| 5,787,169 A * | 7/1998 | Eldridge et al. | | 713/165 |
| 5,937,066 A * | 8/1999 | Gennaro et al. | | 380/286 |
| 6,052,469 A * | 4/2000 | Johnson et al. | | 380/286 |
| 6,959,394 B1 * | 10/2005 | Brickell et al. | | 726/5 |
| 7,177,424 B1 * | 2/2007 | Furuya et al. | | 380/37 |
| 7,681,234 B2 * | 3/2010 | Florencio et al. | | 726/22 |
| 2002/0138728 A1 * | 9/2002 | Parfenov et al. | | 713/170 |
| 2003/0046533 A1 * | 3/2003 | Olkin et al. | | 713/152 |
| 2003/0093680 A1 * | 5/2003 | Astley et al. | | 713/183 |
| 2003/0172290 A1 * | 9/2003 | Newcombe et al. | | 713/200 |
| 2004/0025057 A1 * | 2/2004 | Cook | | 713/201 |
| 2004/0151323 A1 * | 8/2004 | Olkin et al. | | 380/280 |
| 2005/0250473 A1 * | 11/2005 | Brown et al. | | 455/411 |
| 2005/0250548 A1 * | 11/2005 | White | | 455/566 |
| 2006/0080536 A1 * | 4/2006 | Teppler | | 713/176 |
| 2006/0129807 A1 * | 6/2006 | Halasz et al. | | 713/163 |
| 2006/0218402 A1 * | 9/2006 | Kerstens et al. | | 713/170 |
| 2007/0180230 A1 * | 8/2007 | Cortez | | 713/156 |
| 2008/0092216 A1 * | 4/2008 | Kawano et al. | | 726/5 |
| 2008/0140849 A1 * | 6/2008 | Collazo | | 709/229 |

OTHER PUBLICATIONS

B. Kaliski. "PKCS #5: Password-Based Cryptography Specification Version 2.0". RFC 2898. Sep. 2000. Network Working Group/RSA Laboratories. pp. 1-34.*
D. Balenson. "Privacy Enhancement for Internet Electronic Mail: Part III: Algorithms, Modes, and Identifiers". RFC 1423. Feb. 1993. Network Working Group. pp. 1-14.*
ISO10126 (Implementation of ISO 10126-2:1991: Banking-Procedures for message encipherment, 1991).*

* cited by examiner

*Primary Examiner* — Brian Shaw
(74) *Attorney, Agent, or Firm* — Shun Yao; Park, Vaughan, Fleming & Dowler LLP

(57) ABSTRACT

One embodiment of the present invention provides a system that facilitates encrypting data. During operation, the system receives unencrypted data to be encrypted. Next, the system preprocesses the unencrypted data to create preprocessed unencrypted data, wherein preprocessing the unencrypted data involves generating a salt (wherein the salt facilitates in determining if the subsequently encrypted data has been altered) and concatenating the salt and the unencrypted data to create the preprocessed unencrypted data. Next, the system encrypts the preprocessed unencrypted data to create the encrypted data. Because the salt has already been applied to the plaintext data, it does not need to be reapplied during the encryption phase as is typically done in encryption. Finally, the system stores a copy of the salt with the encrypted data.

21 Claims, 5 Drawing Sheets

COMPUTING ENVIRONMENT 100

PT'1=PT1⊕PT2
PT'2=PT2⊕PT3
PT'3=PT3

METHOD AND APPARATUS FOR ENCRYPTING DATA TO FACILITATE RESOURCE SAVINGS AND TAMPER DETECTION

BACKGROUND

1. Field of the Invention

The present invention relates to encryption. More specifically, the present invention relates to a method and an apparatus for encrypting data to facilitate resource savings and detection of tampering.

2. Related Art

In order to securely store data, administrators often encrypt the data before storing the data in a database. However, encrypting data typically expands the data beyond its original size. This expansion is usually associated with three factors: (1) the use of an initialization vector or salt; (2) the use of an integrity check; and (3) block justification of (padding of) the data. The exact factors will depend on the type of chaining and encryption that is used on the data.

During block justification, input data is padded to a length that is an exact multiple of an encrypted block size. In doing so, various padding methods can be used. Under one commonly used padding technique (PKCS5 padding), the padding can potentially add as much as an entire block length to the encrypted text.

The purpose of the initialization vector is to "randomize" the plaintext data. The initialization vector is also an example of "salt", which is intended to describe the act of modifying messages to make them appear more random. This is particularly useful for plaintext data that comes from a small input set. For example, if you are storing patient data in a database table, and you have a column that indicates if the patient is HIV positive, there are only two possible values, "yes" and "no." Thus, if the same encryption key is used for the table, without using an initialization vector to randomize the field values, it is possible to determine which patients have the same value in the HIV column because only two possible cipher-texts corresponding to the two-possible plaintext values would exist in the table.

The primary purpose of the integrity check is to prevent meaningful tampering of the cipher-text. Specifically, you do not want someone to be able to flip one or more bits in an encrypted block to obtain a meaningful different plaintext value when you decrypt the new encrypted block. For example, if the data is salary data, an attacker should not be able to flip one or more bits in an encrypted block to produce a new, valid, plaintext salary value when the block is decrypted. This attack will generally fail if an integrity check is used because the new plaintext will no longer match the integrity check. One typical way in which the integrity check is performed is by saving a hash of the data along with the encrypted data. In this case, if the data is subsequently tampered with, a hash which is generated from the new data will no longer match the existing hash.

In order to ensure that encrypted data is safe from the problems listed above, all of the above steps are typically used to secure encrypted data. However, as previously mentioned, all of these steps can lead to an expansion in the size of the data. If the dataset includes many small values, such as while encrypting financial information, this can cause significantly more data-storage resources to be used than storing the data in plaintext. Furthermore, some of these steps are computationally expensive. For example, performing a hashing function on thousands of small values can consume a significant amount of resources.

Hence, what is needed is a method and an apparatus for providing secure storage of data that is resistant to the types of attacks described above, but without the problems described above.

SUMMARY

One embodiment of the present invention provides a system that facilitates encrypting data. During operation, the system receives unencrypted data to be encrypted. Next, the system preprocesses the unencrypted data to create preprocessed unencrypted data, wherein preprocessing the unencrypted data involves generating a salt (wherein the salt facilitates in determining if the subsequently encrypted data has been altered) and concatenating the salt and the unencrypted data to create the preprocessed unencrypted data. Next, the system encrypts the preprocessed unencrypted data to create the encrypted data. Because the salt has already been applied to the plaintext data, it does not need to be reapplied during the encryption phase as is typically done in encryption. Finally, the system stores a copy of the salt with the encrypted data.

In some embodiments of the present invention, preprocessing the unencrypted data further involves: calculating an amount of padding needed to block-justify the preprocessed unencrypted data; generating a padding byte that specifies the amount of padding; concatenating the padding byte, the salt, the padding, and the unencrypted data to create the block-justified plaintext message; and block-chaining the block-justified plaintext message by performing an XOR operation on each block of the block-justified plaintext message with each subsequent block of the block-justified plaintext message to create the preprocessed unencrypted data.

In some embodiments of the present invention, the system also decrypts the encrypted data to produce the preprocessed unencrypted data. During the decryption process, the system performs an XOR operation on the preprocessed unencrypted data to produce the block-justified plaintext message. Next, the system retrieves the salt from the block-justified plaintext message. The system then determines if the salt matches the copy of the salt stored along with the encrypted data. If so, the system produces the unencrypted data from the block-justified plaintext message. However, if not, the system indicates that the encrypted data has been altered.

In some embodiments of the present invention, the salt is randomly generated and can be a fixed or a variable size.

In some embodiments of the present invention, the block-chaining can involve any method of block-chaining, so that changes in any part of the message affect the first block of the message with high probability.

In some embodiments of the present invention, creating the block-justified plaintext message involves concatenating the padding and the unencrypted data so that the block-justified plaintext message includes a fixed padding string rather than the salt.

In some embodiments of the present invention, preprocessing the unencrypted data involves using a predefined padding method, such as PKCS5 (Public-Key Cryptography Standards #5) padding.

In some embodiments of the present invention, the system saves the encrypted data and the copy of the salt in a database.

In some embodiments of the present invention, block justification is not required by the encryption method (such as Cipher-Feedback Mode of encryption). In this case, the unencrypted message is still preprocessed and the salt is appended, but the additional padding of a fixed string is not necessarily performed to further save space.

In some embodiments of the present invention, the salt is padded to a full block length with a fixed string and fed into the encryption algorithm as an initialization vector. In the case of Cipher-Feedback Mode, this is necessary to preserve the encryption properties. In either case, the salt can also be a part of the preprocessed unencrypted message because it doubly serves as an integrity check. Note that a fixed string can also be used in the preprocessed unencrypted message instead of the salt.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a non-transitory computer-readable storage medium, which may be any device that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing non-transitory computer readable media now known or later developed.

Overview

Figure 1:
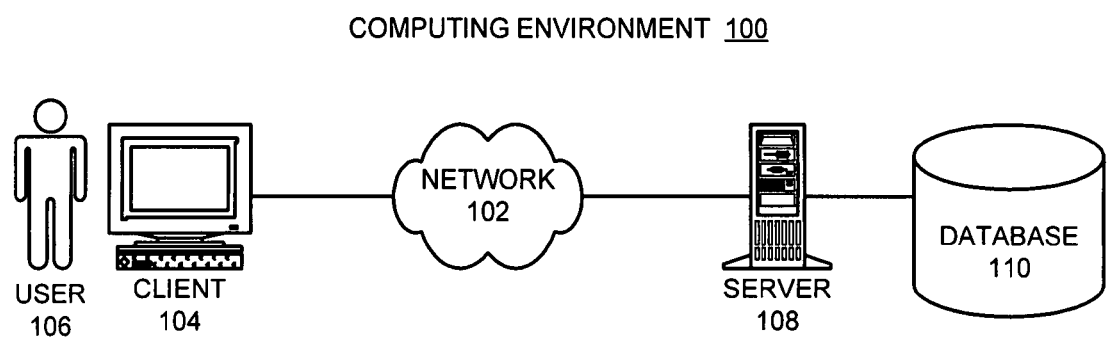
FIG. 1 illustrates a computing environment in accordance with an embodiment of the present invention.

FIG. 1 illustrates a computing environment 100 in accordance with an embodiment of the present invention. Computing environment 100 includes network 102, client 104, user 106, server 108, and database 110.

Network 102 can generally include any type of wired or wireless communication channel capable of coupling together computing nodes. This includes, but is not limited to, a local area network, a wide area network, or a combination of networks. In one embodiment of the present invention, network 102 includes the Internet.

Client 104 can generally include any node on a network including computational capability and including a mechanism for communicating across the network.

Server 108 can generally include any computational node including a mechanism for servicing requests from a client for computational and/or data storage resources.

Database 10 can include any type of system for storing data in non-volatile storage. This includes, but is not limited to, systems based upon magnetic, optical, or magneto-optical storage devices, as well as storage devices based on flash memory and/or battery-backed up memory.

One embodiment of the present invention provides a system that facilitates encrypting data. During operation, the system receives unencrypted data to be encrypted. Note that the system can receive the data from a user, such as user 106, a database, such as database 110, or from any other source. Next the system preprocesses the unencrypted data to create preprocessed unencrypted data.

Preprocessing the unencrypted data involves: generating a salt, wherein the salt facilitates in determining if the subsequently encrypted data has been altered; calculating an amount of padding needed to block-justify the preprocessed unencrypted data; generating a padding byte that specifies the amount of padding; concatenating the padding byte, the salt, the padding, and the unencrypted data to create a block-justified plaintext message; and block-chaining the block-justified plaintext message by performing an XOR operation on each block of the block-justified plaintext message with each subsequent block of the block-justified plaintext message to create the preprocessed unencrypted data. Next, the system encrypts the preprocessed unencrypted data to create the encrypted data. Finally, the system stores a copy of the salt with the encrypted data.

Note that storing the encrypted data and the copy of the salt can involve storing the encrypted data and the copy of the salt in database 110, in memory or client 104, or any location.

In some embodiments of the present invention, the system also decrypts the encrypted data to produce the preprocessed unencrypted data. In this embodiment, the system performs an XOR operation on the preprocessed unencrypted data to produce the block-justified plaintext message. Next, the system retrieves the salt from the block-justified plaintext message. The system then determines if the salt matches the copy of the salt stored along with the encrypted data. If so, the system produces the unencrypted data from the block-justified plaintext message. However, if not, the system indicates that the encrypted data has been altered.

Note that the system may be embodied within client 104, server 108, database 110, or in an appliance that is coupled to network 102.

In some embodiments of the present invention, the salt is not included in the preprocessed message and instead a fixed string can be used. In this case, the salt does not need to be included with the encrypted message and the fixed string can be a system wide parameter. The fixed string serves as an integrity check.

In some embodiments of the present invention, padding to block justify the unencrypted message is not performed.

Figure 2A:
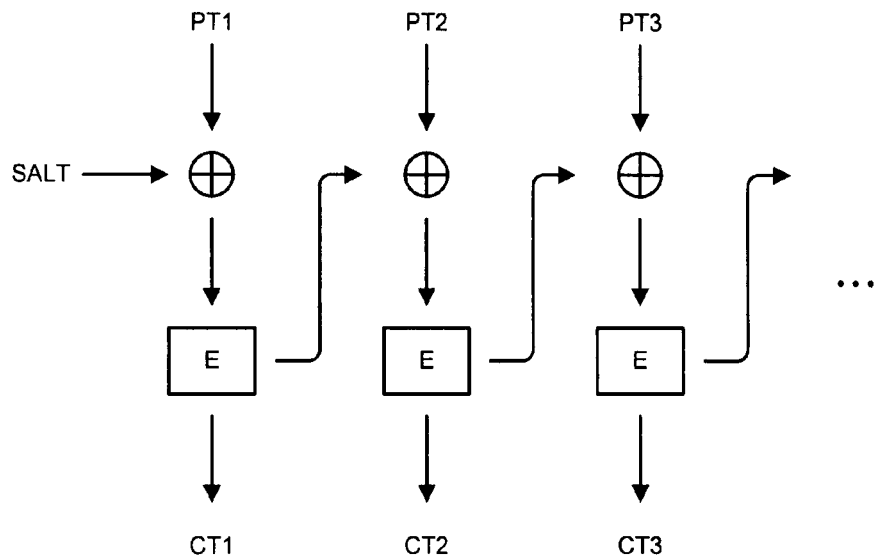
FIG. 2A illustrates cipher-block chaining in accordance with an embodiment of the present invention.

FIG. 2A illustrates simple cipher-block chaining. In this example, each block of the plaintext (blocks PT1, PT2, PT3, etc.) is XORed with the previous encrypted block prior to encryption to form a block of cipher-text. In addition, the first block, PT1, is XORed with the initialization vector and encrypted to create CT1. The second block, PT2, is then XORed with CT1 and encrypted to create CT2. However, in this example, if someone tampers with CT2, during decryption and the subsequent XOR operation, only PT2 and PT3 will produce incorrect values while PT1 will still decrypt correctly. This is why traditional systems typically employ a hash operation to generate a hash value which is used during an integrity check. By contrast, in embodiments of the present invention, the salt acts to replace the initialization vector and also serves as an integrity check. This is made possible by the preprocessing of the plaintext prior to encryption.

Figure 2B:
FIG. 2B illustrates plaintext preprocessing in accordance with an embodiment of the present invention.
Figure 2C:
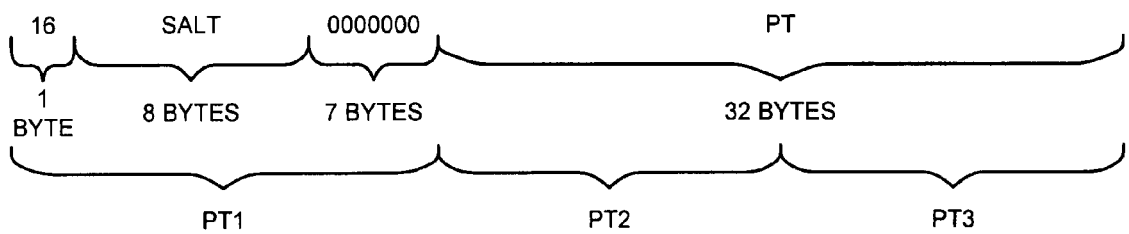
FIG. 2C illustrates an example of plaintext preprocessing in accordance with an embodiment of the present invention.

FIG. 2B and FIG. 2C illustrate an example of plaintext preprocessing in accordance with an embodiment of the present invention.

In this example, PB represents the padding byte which indicates where in the block of data the actual message data begins. As illustrated in FIG. 2C, PB is 16, indicating that the message, PT, starts at the 16$^{th}$ byte. The salt is 8 bytes in length, and PT is 32 bytes. Assuming that the system is using 16 byte blocks, then the padding needs to be 7 bytes to block-justify the data for encryption. Note that the salt can be adjusted in size to fit the particular use of this technique. In this case, the salt is set to length 8, but it can be easily expanded or contracted depending on specific requirements. The length of the salt can then be stored either with the message, or as a system parameter.

Once the PB has been determined and the padding has been added, the system breaks the data up into individual blocks, PT1, PT2, PT3, etc. In this example, there are only three blocks, PT1-PT3. The system then computes PT'1 to PT'3 by performing an XOR operation on each block with each subsequent block. For example, the system performs an XOR operation on PT1 and PT2 to produce PT' 1. Finally, the last block (PT3 in this example) is carried over as the last block of PT' (PT'3 in this example) since there are no more blocks of PT with which to perform an XOR operation. Once PT' has been calculated, PT' is encrypted to create the encrypted data.

Note that any change in the encrypted data will be carried back to PT1 when the XOR operation is performed on PT' to produce PT. Because the salt is part of PT1, any modification to the encrypted data will result in the salt not matching the salt that was stored along with the encrypted data. In this way, the salt provides both randomness to the messages and an integrity check.

Encrypting Data

Figure 3:
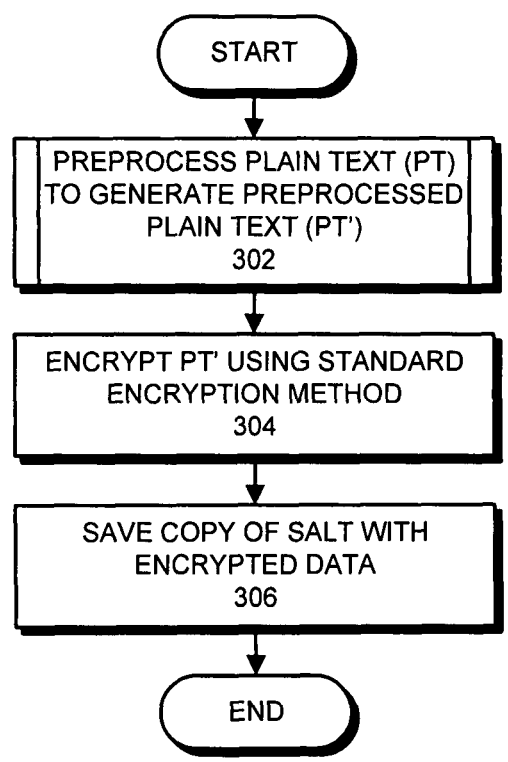
FIG. 3 presents a flowchart illustrating the process of encrypting data in accordance with an embodiment of the present invention.

FIG. 3 presents a flowchart illustrating the process of encrypting data in accordance with an embodiment of the present invention. The system starts by preprocessing the plaintext (PT) to generate the preprocessed text (PT') (step 302). This step will be described in more detail in the description of FIG. 4.

Next, the system encrypts PT' using a standard encryption method, typically without the additional use of an initialization vector or padding (step 304). Note that any available encryption method may be used. Finally, the system saves a copy of the salt along with the encrypted data (step 306).

Note that the salt is used as an integrity check in the present invention. This will be described in more detail below. Note that saving the copy of the salt along with the encrypted data can involve saving both the copy of the salt and the encrypted data in a database, such as database 110, or saving the copy of the salt along with the encrypted data can involve sending the copy of the salt and the encrypted data to a third party, such as server 108.

Also note that it is not necessary to use the copy of the salt to decrypt the data, as you would with an initialization vector, but it is necessary to use the copy of the salt to perform the integrity check. In such cases where the data is known to have been compromised, or when an integrity check is not necessary, then the copy of the salt can be disregarded.

Preprocessing Plaintext Data

Figure 4:
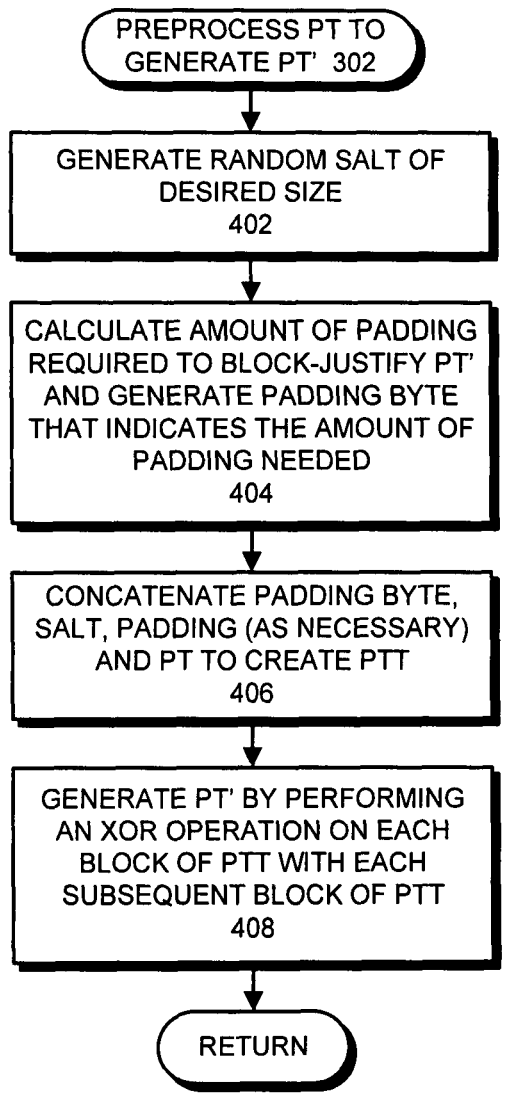
FIG. 4 presents a flowchart illustrating the process of preprocessing the plaintext data in accordance with an embodiment of the present invention.

FIG. 4 presents a flowchart illustrating the process of preprocessing the plaintext data in accordance with an embodiment of the present invention. The system starts preprocessing PT to generate PT' by generating a random salt of a desired size (step 402).

Note that the salt may be generated on the fly, or may be predetermined by another process. Also note that the size of the salt can be fixed, or can be variable determining on the space available. For example, in one embodiment of the present invention, if during preprocessing it is determined that a large amount of padding will be necessary to block-justify PT', then the system may elect to reduce the amount of padding and increase the length of salt. In some embodiments of the present invention, the salt size is adjusted to eliminate the padding completely.

Next, the system calculates the amount of padding necessary to block-justify PT', and generates a padding byte that indicates the amount of padding needed (step 404). The system then concatenates the padding byte, the salt, the padding (as necessary), and PT to create PTT (step 406). Note that any type of padding can be used. For example, the padding can include a repetition of one character (such as all "0"s), or the padding can include random characters. In one embodiment, a fixed string of characters may be beneficial because having a fixed string of characters would further strengthen the integrity check.

Finally, the system generates PT' by performing an XOR operation on each block of PTT with each subsequent block of PTT (step 408). Note that because of this block-chaining of the plaintext (prior to encryption), with high probability any change or alteration to a block of PT' will result in incorrect value being computed for the salt when an XOR operation is performed on PT' to produce PT (as described previously in the description of FIG. 2).

Decrypting Data

Figure 5:
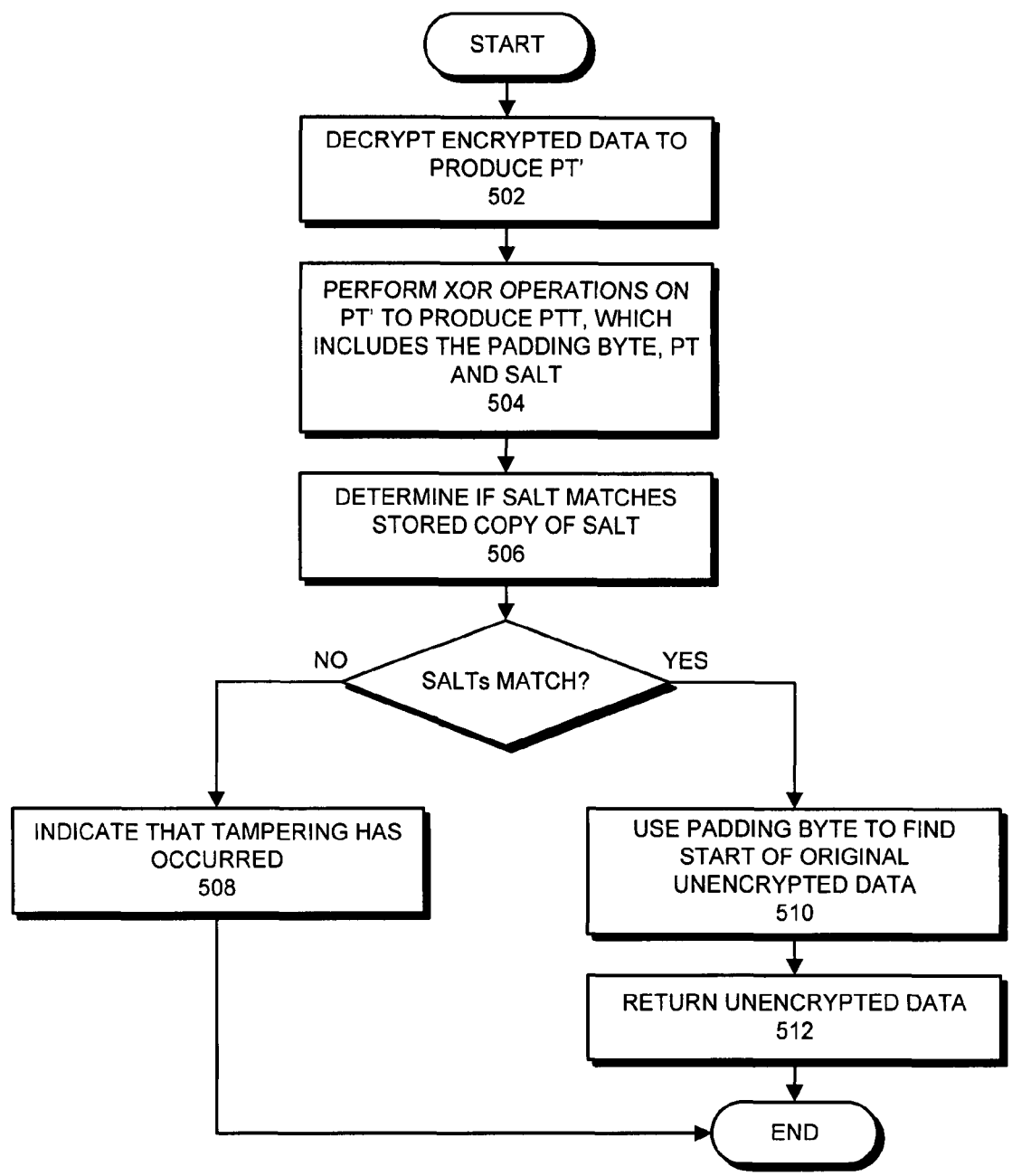
FIG. 5 presents a flowchart illustrating the process of decrypting data in accordance with an embodiment of the present invention.

FIG. 5 presents a flowchart illustrating the process of decrypting data in accordance with an embodiment of the present invention. The system starts by decrypting the encrypted data to produce PT' (step 502). The system then performs XOR operations on PT' to produce PTT, which includes the padding byte, the salt, the padding, and PT (step 504). Next, the system determines if the copy of the salt that was stored along with the encrypted data matches the salt that was recovered from PT' via XOR (step 506).

If the salts do not match, the system indicates that tampering has occurred (step 508) and performs any tasks that have been predefined for this scenario.

If the salts do match, then the system uses the padding byte to determine the starting location of the original unencrypted data (step 510). The system then returns the unencrypted data (step 512).

One embodiment of the present invention reduces the amount of resources needed to encrypt and store data. Because the salt acts as both a source of randomness and as an integrity check, valuable space can be saved over having a separate salt and an integrity check. If the example illustrated in FIG. 2B were encrypted under a typical existing system, the 32-byte message would be padded to 48 bytes, the initialization vector would add another 16 bytes, resulting 64 bytes, and then the 20-byte integrity check (hash) would result in a total length of 84 bytes. By contrast, one embodiment of the present invention will provide the same functionality (salt, and integrity check) with less computational overhead and a total length of 56 bytes.

Furthermore, because existing integrity checks typically involve hashing operations, the present invention provides an increase in performance over existing solutions since hashing operations are considerably more resource-intensive than XOR operations.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for accessing encrypting data, the method comprising:
    selecting, by a computer, encrypted data on which to perform an integrity check, wherein the encrypted data is stored in a data repository along with a first salt plaintext that has been stored in association with the encrypted data;
    decrypting the encrypted data to produce preprocessed unencrypted data;
    performing an XOR operation on the preprocessed unencrypted data to produce a block-justified plaintext message;
    obtaining, from the block-justified plaintext message, a padding byte indicating both an amount of randomly generated padding appended to a salt plaintext needed to block-justify unencrypted data and a byte offset within the block-justified plaintext message where the unencrypted data begins, wherein the padding byte, the salt plaintext, the amount of padding and the unencrypted data combination comprise the block-justified plaintext message;
    retrieving the salt plaintext from the block-justified plaintext message based on the padding byte of the block-justified plaintext message;
    determining whether the retrieved salt plaintext matches the first salt plaintext; and
    if the retrieved salt plaintext does not match the first salt plaintext, indicating that the encrypted data has been altered.

2. The method of claim 1, wherein the data repository includes a database, and wherein the encrypted data and the first salt plaintext are saved in the database.

3. The method of claim 1, further comprising encrypting the unencrypted data, wherein encrypting involves:
    generating the first salt plaintext;
    calculating a size for a randomly-generated padding based on the amount of randomly-generated padding needed to block-justify the unencrypted data and the first salt plaintext;
    generating the randomly-generated padding with a size equal to the calculated size;
    concatenating the first salt plaintext, the randomly-generated padding and the unencrypted data to create preprocessed unencrypted data; and
    encrypting the preprocessed unencrypted data to create the encrypted data;
    wherein responsive to encrypting, the method further comprises storing the first salt plaintext and the encrypted data in the data repository.

4. The method of claim 3, further comprising performing block chaining on the block-justified plaintext message, so that changes in any part of the block-justified plaintext message affect the first block of the block-justified plaintext message with high probability.

5. The method of claim 3, wherein creating the preprocessed unencrypted data further involves:
    generating the padding byte that specifies the amount of padding needed to block-justify the unencrypted data;
    concatenating the padding byte, the first salt plaintext, and the unencrypted data to create the block-justified plaintext message; and
    block-chaining the block-justified plaintext message by performing an XOR operation on each block of the block-justified plaintext message with each subsequent block of the block-justified plaintext message to create the preprocessed unencrypted data.

6. The method of claim 3, wherein creating the preprocessed unencrypted data involves concatenating the randomly-generated padding and the unencrypted data to create the block-justified plaintext message that includes a fixed padding string and no salt.

7. The method of claim 3, further comprising preprocessing the unencrypted data using a predefined padding method, such as PKCS5 (Public-Key Cryptography Standards #5) padding.

8. A non-transitory computer-readable storage medium storing instructions that when executed by a computer cause the computer to perform a method for accessing encrypting data, the method comprising:
    selecting, by a computer, encrypted data on which to perform an integrity check, wherein the encrypted data is stored in a data repository along with a first salt plaintext that has been stored in association with the encrypted data;
    decrypting the encrypted data to produce preprocessed unencrypted data;
    performing an XOR operation on the preprocessed unencrypted data to produce a block-justified plaintext message;
    obtaining, from the block-justified plaintext message, a padding byte indicating both an amount of randomly generated padding appended to a salt plaintext needed to block-justify unencrypted data and a byte offset within the block-justified plaintext message where the unencrypted data begins, wherein the padding byte, the salt plaintext, the amount of padding and the unencrypted data combination comprise the block-justified plaintext message;
    retrieving the salt plaintext from the block-justified plaintext message based on the padding byte of the block-justified plaintext message;
    determining whether the retrieved salt plaintext matches the first salt plaintext; and
    if the retrieved salt plaintext does not match the first salt plaintext, indicating that the encrypted data has been altered.

9. The non-transitory computer-readable storage medium of claim 8, wherein the data repository includes a database, and wherein the encrypted data and the first salt plaintext are saved in the database.

10. The non-transitory computer-readable storage medium of claim 8, wherein the method further comprises encrypting the unencrypted data, wherein encrypting involves:
    generating the first salt plaintext;
    calculating a size for a randomly-generated padding based on the amount of randomly-generated padding needed to block-justify the unencrypted data and the first salt plaintext;
    generating the randomly-generated padding with a size equal to the calculated size;
    concatenating the first salt plaintext, the randomly-generated padding and the unencrypted data to create preprocessed unencrypted data; and
    encrypting the preprocessed unencrypted data to create the encrypted data;

wherein responsive to encrypting, the method further comprises storing the first salt plaintext and the encrypted data in the data repository.

11. The non-transitory computer-readable storage medium of claim 10, further comprising performing block chaining on the block-justified plaintext message, so that changes in any part of the block-justified plaintext message affect the first block of the block-justified plaintext message with high probability.

12. The non-transitory computer-readable storage medium of claim 10, wherein creating the preprocessed unencrypted data further involves:
   generating the padding byte that specifies the amount of padding needed to block-justify the unencrypted data;
   concatenating the padding byte, the first salt plaintext, and the unencrypted data to create the block-justified plaintext message; and
   block-chaining the block-justified plaintext message by performing an XOR operation on each block of the block-justified plaintext message with each subsequent block of the block-justified plaintext message to create the preprocessed unencrypted data.

13. The non-transitory computer-readable storage medium of claim 10, wherein creating the preprocessed unencrypted data involves concatenating the randomly-generated padding and the unencrypted data to create the block-justified plaintext message that includes a fixed padding string and no salt.

14. The non-transitory computer-readable storage medium of claim 10, further comprising preprocessing the unencrypted data using a predefined padding method, such as PKCS5 (Public-Key Cryptography Standards #5) padding.

15. An apparatus for accessing encrypting data, the apparatus comprising:
   a processor;
   a memory;
   a selection mechanism coupled to the processor to select encrypted data on which to perform an integrity check, wherein the encrypted data is stored in a data repository along with a first salt plaintext that has been stored in association with the encrypted data;
   a decryption mechanism configured to decrypt the encrypted data to produce preprocessed unencrypted data;
   an XOR mechanism within the decryption mechanism configured to perform an XOR operation on the preprocessed unencrypted data to produce a block-justified plaintext message;
   a retrieval mechanism within the decryption mechanism configured to retrieve, from the block-justified plaintext message:
      a padding byte indicating both an amount of randomly generated padding appended to a salt plaintext needed to block-justify unencrypted data and a byte offset within the block-justified plaintext message where the unencrypted data begins, wherein the padding byte, the salt plaintext, the amount of padding and the unencrypted data combination comprise the block-justified plaintext message; and
      the salt plaintext based on the padding byte of the block-justified plaintext message; and
   a determination mechanism within the decryption mechanism configured to determine whether the retrieved salt plaintext matches the first salt plaintext;
   wherein the determination mechanism is configured to indicate that the encrypted data has been altered if the retrieved salt plaintext does not match the first salt plaintext.

16. The apparatus of claim 15, wherein the data repository includes a database, and wherein the encrypted data and the first salt plaintext are saved in the database.

17. The apparatus of claim 15, further comprising:
   a generating mechanism coupled to the processor to:
      generate the first salt plaintext;
      calculate a size for a randomly-generated padding based on the amount of randomly-generated padding needed to block-justify the unencrypted data and the first salt plaintext;
      generate the randomly-generated padding with a size equal to the calculated size;
   a concatenating mechanism coupled to the processor to concatenate the first salt plaintext, the randomly-generated padding and the unencrypted data to create preprocessed unencrypted data;
   an encryption mechanism coupled to the processor to encrypt the preprocessed unencrypted data to create the encrypted data; and
   a storage mechanism coupled to the processor to store the first salt plaintext and the encrypted data in the data repository in response to encrypting the preprocessed unencrypted data.

18. The apparatus of claim 17, wherein the concatenating mechanism is further configured to perform block chaining on the block-justified plaintext message, so that changes in any part of the block-justified plaintext message affect the first block of the block-justified plaintext message with high probability.

19. The apparatus of claim 17, wherein the concatenating mechanism is further configured to:
   generate the padding byte that specifies the amount of padding needed to block-justify the unencrypted data;
   concatenate the padding byte, the first salt plaintext, and the unencrypted data to create the block-justified plaintext message; and
   block-chain the block-justified plaintext message by performing an XOR operation on each block of the block-justified plaintext message with each subsequent block of the block-justified plaintext message to create the preprocessed unencrypted data.

20. The apparatus of claim 17, wherein the concatenating mechanism is further configured to concatenate the randomly-generated padding and the unencrypted data to create the block-justified plaintext message that includes a fixed padding string and no salt.

21. The apparatus of claim 17, wherein the concatenating mechanism is further configured to preprocess the unencrypted data using a predefined padding method, such as PKCS5 (Public-Key Cryptography Standards #5) padding.

* * * * *

UNITED STATES PATENT AND TRADEMARK OFFICE
CERTIFICATE OF CORRECTION

PATENT NO.        : 8,744,076 B2  
APPLICATION NO.   : 11/732847  
DATED             : June 3, 2014  
INVENTOR(S)       : Youn Page 1 of 1

It is certified that error appears in the above-identified patent and that said Letters Patent is hereby corrected as shown below:

In the Specification

In column 4, line 4, delete "10" and insert -- 110 --, therefor.

In column 5, line 24, delete "PT' 1" and insert -- PT'1 --, therefor.

In column 5, line 27, delete "PT' 1." and insert -- PT'1. --, therefor.

In the Claims

In column 8, line 22, in Claim 8, delete "selecting, by a computer," and insert -- selecting --, therefor.

Signed and Sealed this  
Seventh Day of July, 2015

Michelle K. Lee  
*Director of the United States Patent and Trademark Office*